Feb. 1, 1927.
L. O. BIRD
1,616,212
HITCH FOR EARTH SCRAPERS
Original Filed May 31, 1924    2 Sheets-Sheet 1
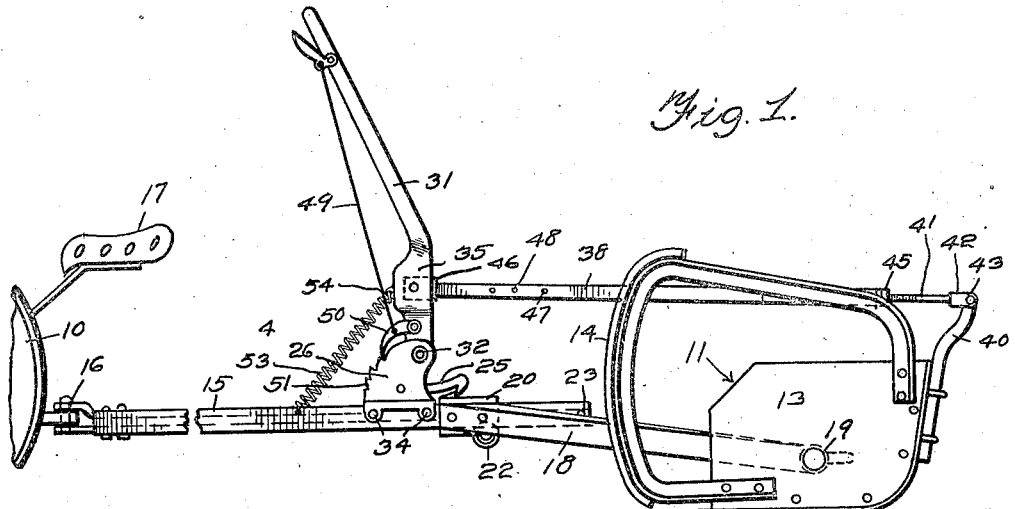
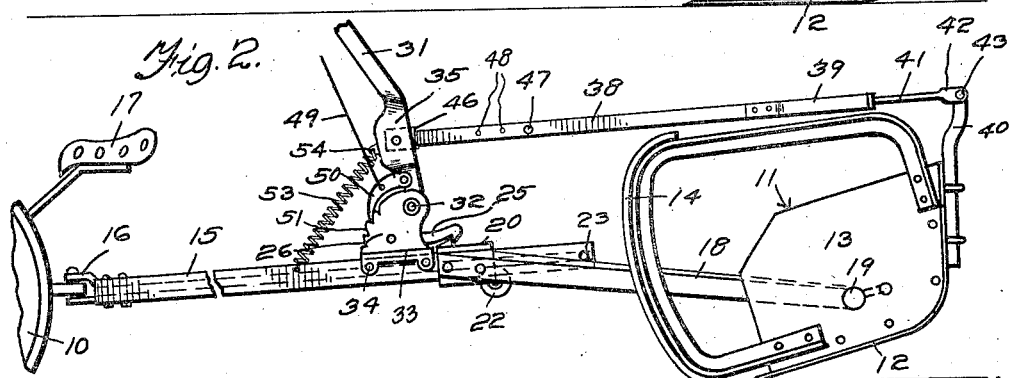
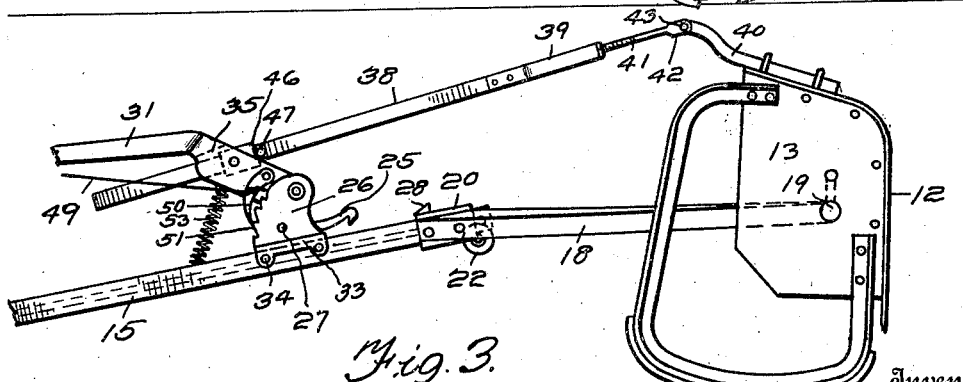
Inventor
Len O. Bird.
By James N. Cryler
His Attorney Feb. 1, 1927.　　　　　　　　　　　　　　　1,616,212
L. O. BIRD
HITCH FOR EARTH SCRAPERS
Original Filed May 31, 1924　　2 Sheets-Sheet 2
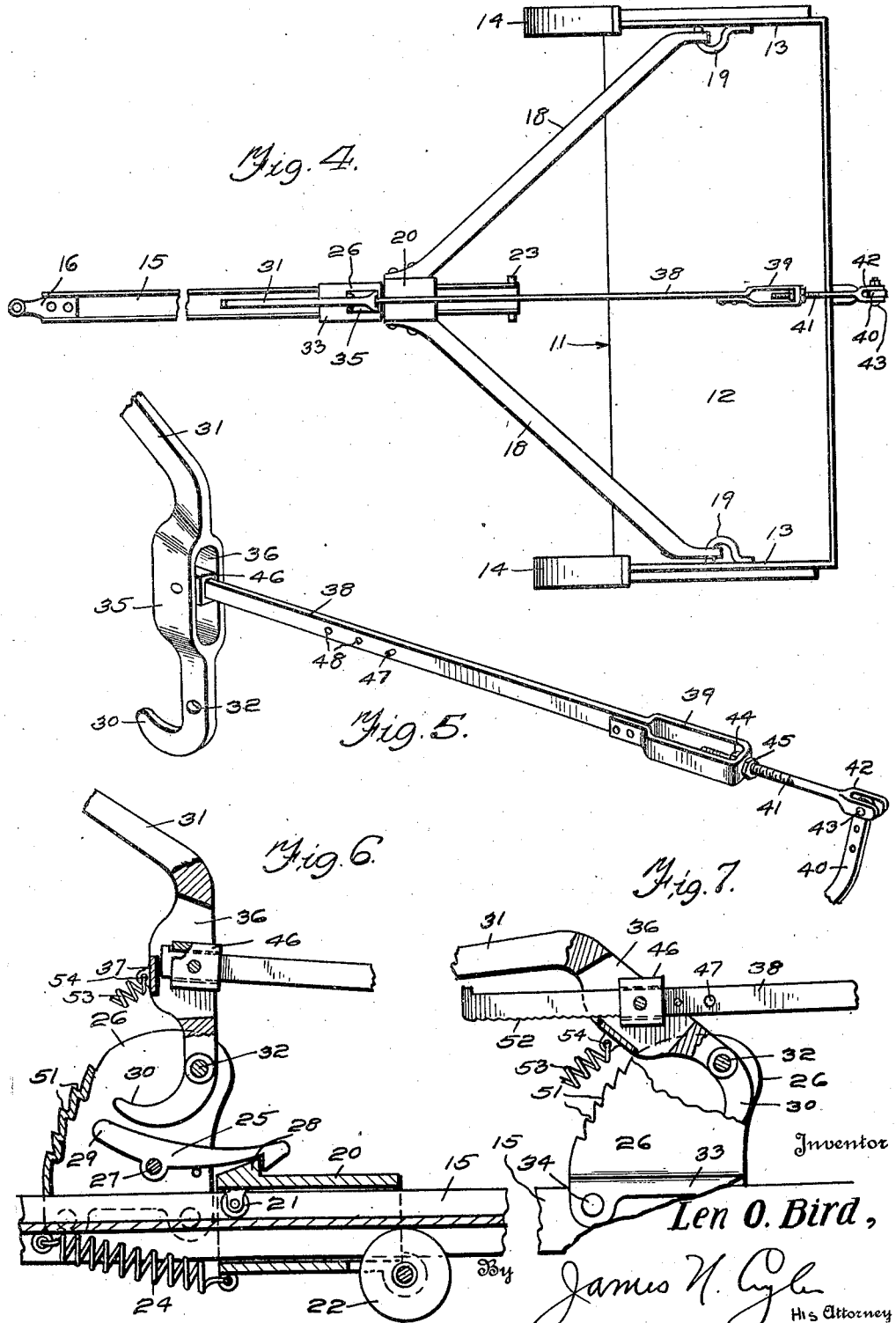
Inventor
Len O. Bird,
By James N. [signature]
His Attorney Patented Feb. 1, 1927.

1,616,212

UNITED STATES PATENT OFFICE.

LEN O. BIRD, OF OCEAN PARK, CALIFORNIA.

HITCH FOR EARTH SCRAPERS.

Application filed May 31, 1924, Serial No. 716,971. Renewed June 21, 1926.

This invention relates to an improved hitching and dumping connection between the standard type of earth scraper known as the Fresno, and the conventional type of tractive power, such as the Fordson tractor.

An important object of the invention is the provision of such a device having means for providing a flexible connection between the source of tractive power and any well known type of earth scraper, such device provided with means for dumping the scraper and returning such scraper to its normal traveling position during the actual forward travel thereof.

A further object is the provision of a hitch of the above mentioned type, having means for varying the degree of forward tilting of the scraper, whereby the load may be distributed in any desired thickness, or may be completely dumped by one movement of the operating handle.

Another important object of the invention resides in the provision of a hitch for an earth scraper having means for dumping the scraper at any desired angle, and also provided with adjustable connections between the hitch and the scraper, whereby the scraper may be permanently set at the proper angle and to also adapt the hitch for application to various types of scrapers now in use.

A still further object of the invention is the provision of a scraper hitch comprising few and simple parts, all of which are strong, durable and highly convenient in use.

Other important objects and advantages of the invention will be apparent during the course of the following description.

In the accompanying drawings,

Figure 1 is a side elevation of a standard Fresno type of scraper, illustrating the invention applied thereto, the forward end thereof being connected to a source of tractive power, Figure 2 is a similar view thereof, but showing the scraper tilted slightly forward as in loading, Figure 3 is a similar view to Figure 1, but showing the scraper as being completely dumped, Figure 4 is a plan view thereof, Figure 5 is a perspective view of an operating lever and its associated connecting link to the scraper, Figure 6 is a vertical longitudinal section through a portion of the hitch in a normal position, and, Figure 7 is a similar view to Figure 6, but showing the parts in their furthermost position, as in completely dumping the scraper.

Referring specifically to the drawings, the numeral 10 designates a source of tractive power, such as the conventional Fordson tractor, and 11 designates an earth scraper of the type known as the Fresno. The scraper is provided with a scooped bottom 12, ends 13 and arcuate runners 14, secured to the ends. The scraper is adapted to ride upwardly upon the runners 14, when the dumping operation takes place. A draft bar of channel formation 15, is provided with a clevis 16 for connection with the tractor. The tractor is provided with the usual driver's seat 17, from which the driver may operate both the tractor and the hitch.

The draft bar 15 has a variable connection with the scraper 11, through the medium of a pair of divergent arms 18, which arms are connected with the ends of the scraper as at 19, and to the draft bar through the medium of a slidable box 20. The box 20 is provided with anti-friction rollers 21 and 22, both operating in the upper and lower channel of the draft bar respectively. A stop pin 23 limits the rearward movement of the box 20 upon the draft bar 15. A strong coil spring 24 tends to urge the box 20 and its associated elements forward upon the bar 15, or to their normal position. Means are provided for retaining the box 20 in its normal position, comprising a latch 25 carried by and pivoted between a pair of spaced plates 26, as shown at 27. The latch 25 is provided with a hooked end adapted for engagement with a lug 28 carried by the top of the box 20. The latch 25 is further provided with a tail extension 29, adapted to be engaged by an extension 30 formed upon an operating lever 31.

The operating lever 31 is pivotally mounted between the plates 26 at a point 32. The plates 26 are provided with lateral extensions 33, which are bolted or otherwise secured to the draft bar 15, as shown at 34. The lever 31 is formed with an enlarged portion 35, which is cut away to form a chamber 36, for a purpose to be described. The chamber 36 is partly closed by a wall 37, as clearly shown in Figs. 6 and 7. The lever 31 is formed at an angle, so that the end thereof may be readily grasped by the operator without the necessity of moving from his seat.

The numeral 38 designates a connecting link between the operating lever 31, and the scraper 11. At its rear end, the link 38 is bent to form an open frame 39, and is provided with an adjustable connection to the arm 40 carried by the rear wall of the scraper. This adjustable connection comprises a relatively long bolt 41, having a forked end 42, which has pivotal connection as at 43 with the arm 40. The opposite end of the bolt passes through an opening in the end of the frame 39, and is adjusted with respect thereto by nuts 44 and 45 upon opposite sides of the frame 39. It will thus be seen that an effective adjustment may be made with respect to the operating lever 31 and the scraper 11, whereby the scraper may be properly adjusted as to angular position. The forward end of the link 38 has a free slidable connection through a box 46, which is in turn pivoted between the walls of the chamber 36, of the lever 31. Forward movement of the link 38 with respect to the box 46, is limited by the wall 37, when the parts are in the normal position. When the parts have been moved to the position for dumping, the lever will take the position shown in Figure 7, at which time the forward end of the link 38 will slide past the wall 37. Forward movement of the link with respect to the lever 31 is limited by a pin. The pin 47 may be adjusted longitudinally of the link 38, in any one of the holes 48.

The operation of the device is as follows:—

Assuming the parts are in their normal position, as shown in Figure 1. When it is desired to load the scraper, the operator grasps the lever 31, and pulls same forwardly enough to cause the edge of the scraper to engage in the ground. After the scraper has been loaded, the lever is then moved rearward, and held in such position by latch mechanism 49. The pawl 50 of the latch 49 engages in teeth 51 carried by the plates 26. This latch 49 is used for holding the lever in normal upright position during the travel of the scraper. During the dumping of the scraper, the operator may release the latch 49, and control the scraper entirely by pressure upwardly upon the lever 31.

After the scraper has been loaded, and transported to the place for dumping, the operator moves the lever 31 forward a sufficient distance to allow the forward end of the link 38 to pass over the upper edge of the wall 37. If a complete dumping is desired, the operator allows the link 38 to pass through the box 46 to the limit of its movement. When the lever 31 is moved forward a sufficient distance to allow the link 38 to pass the wall 37, the tail 30 will have contacted with the tail 29 of the latch 25, and pressed same down, this action in turn releasing the box 20, allowing it to move rearward upon the draw bar 15 to the pin 23. This movement will cause the scraper to ride slightly upward upon the runners, due to tendency of the scraper to tilt forward, and at the same time being held by the link 38. If a complete dumping is desired, the lever 31 is pushed down to the limit of its movement, and the combined shifting of the link 38 through the box 46, and the box 20 on the bar 15, will cause the scraper to take the position shown in Figure 3. When it is desired to only partially dump the scraper, the lever 31 is moved forward enough to cause the link 38 to clear the wall 37, and to cause the latch 25 to disengage with the lug 28. As soon as the link 38 starts to slide past the wall 37, the operator immediately lifts upward upon the lever 31, which action causes the wall 37 to bind against the lower edge of the link 38. It will therefore be observed that the forward tilting of the scraper can be controlled to a fine degree. To insure an easier gripping of the wall upon the edge of the link, such lower edge of the link may be formed with small corrugations 52, although not essential. As clearly shown in Figure 6, sufficient space is left between the tail 30 of the lever 31, and the tail 29 of the latch 25, to allow of a slight forward movement of the lever 31 for loading, without releasing the said latch.

When returning the scraper to its normal travelling position the operator grasps the lever 31 and gives it a quick upward pull. This movement is transmitted to the link 38, by reason of the pin contacting with the box 46, and this quick movement will cause the scraper to rock rearward upon its runners and down to the normal position before the upward movement of the lever 31 causes the wall 37 to bind against the lower edge of the link. After the scraper has been dumped, the spring 24 will pull the box 20 back to its normal position, causing the lug 28 to ride under the hooked end of the latch 25. When the parts are all in their normal position, the latch 49 is released and holds the parts against accidental movement.

It will be observed from the foregoing, that simple and efficient means have been provided for controlling the loading and dumping of earth scrapers. The parts are all simple and easy to operate, and are constructed in such way as to avoid the probability of same becoming disarranged. The various adjustments provided will adapt the hitch to various types of scrapers. The entire operation of the scraper, from the loading, to the dumping and back to normal position, is controlled by the single operating lever, without the necessity of the operator stopping or reversing the tractor.

It is to be understood that the form of the invention herewith shown and described is to be taken as the preferred one, but that various changes in the shape, size and arrangement of parts may be resorted to without departing from the spirit of the invention or the scope of the subjoined claims.

Having described my invention, what I claim is:—

1. In combination a tractor and a hitch for an earth scraper, said hitch comprising a draft bar, variable connections between the draft bar and the scraper, an operating handle carried by said draft bar, means operable by said handle when in a predetermined position for releasing the variable connection between the draft bar and the scraper, link connection between the handle and the scraper, and means whereby said link may be released with respect to said handle when the handle is moved to a predetermined position.

2. In combination a tractor and an earth scraper, a hitch therefor, said hitch comprising a draft bar of channel formation, variable connection between the draft bar and the scraper, an operating lever carried by said draft bar, means for latching said lever in predetermined positions, a latch for controlling the variable connection between the draft bar and the scraper, means carried by said lever for releasing said latch at predetermined positions, a link connection between the lever and the rear of the scraper, whereby said scraper may be tilted forward, adjustable connection between said link and said scraper, and means for releasing said link with respect to said lever, whereby said scraper may be completely dumped.

3. In a hitch of the character described comprising a draft bar, divergent arms connecting said draft bar with an earth scraper, a sliding support for said divergent arms for connecting said arms with said draft bar, anti-friction rollers carried by said support, a stop carried by said draft bar for limiting the movement of said support upon said bar, a quadrant secured to the draft bar, a latch member pivoted to said quadrant, said latch member adapted to engage and hold said support in normal position, an operating lever pivoted to said quadrant and provided with a lower extension for engagement with said latch member, whereby said latch member is released when the lever is moved to a predetermined position, and a link connecting said lever and said scraper, said link adapted to be released when the lever is moved to a predetermined position.

4. A hitch of the character described comprising a draft bar, a box slidable thereon, a spring for moving the box to its normal position, latch mechanism for retaining the box in its normal position, divergent arms carried by said box and having pivotal connection with the ends of an earth scraper, anti-friction means between the box and said draft bar, quadrant plates carried by said draft bar, an operating lever pivoted between said plates, means carried by said lever for releasing said latch when said lever is moved to a predetermined position, said lever provided with an elongated chamber open upon one side and partially closed upon the other side, a box pivotally mounted within said chamber, a link slidably mounted in said last named box, said link provided with an adjustable connection at one end with the rear of the scraper, said link held against sliding movement with respect to the last named box when the lever is in the normal position, and said link adapted to slide through said last named box and said chamber when the lever is in another position, whereby a variable connection is provided between said lever and the scraper.

5. A hitch of the character described comprising a draft bar, variable connection between said bar and an earth scraper, latch means for retaining said connection in a predetermined position, an operating lever carried by said bar, latch mechanism for said lever, means carried by the lever for releasing the first named latch, a link for connecting said lever with said scraper whereby said scraper may be tilted forward, variable connection between said link and said lever, said variable connection comprising a box pivoted to said lever and adapted to receive said link, said lever when in one position adapted to hold the link against movement, and when in another position adapted to permit said link to slide through said box, said lever provided with means for retaining the link in any desired position during its sliding movement through the box.

6. In combination a tractor and an earth scraper, a hitch therefor, said hitch comprising a draft bar, variable connection between said draft bar and said scraper, an operating lever carried by the draft bar, latch means for normally retaining the variable connection in one position, means for releasing the variable connection at predetermined positions of the operating lever, link connection between said lever and said scraper whereby said scraper may be tilted forward, means associated with said lever and said links, whereby said links may be released with respect to said lever when said lever is in a predetermined position whereby said link connection is effectively shortened with respect to the said lever and scraper.

7. The combination with an earth scraper and a tractor, a hitch for connecting said scraper and said tractor, said hitch comprising a draft bar, a boxing slidably mounted on said draft bar and normally latched in one position, divergent arms connecting said boxing with said scraper, anti-friction means carried by said boxing for engagement with the draft bar to facilitate the sliding of said boxing upon said bar, and means operable by the operator of the tractor for releasing said boxing to permit it to slide freely upon said draft bar, substantially as shown and described.

In testimony whereof I affix my signature.

LEN O. BIRD.